(12) United States Patent
Agesen et al.

(10) Patent No.: US 7,149,843 B1
(45) Date of Patent: *Dec. 12, 2006

(54) SYSTEM AND METHOD FOR DETECTING ACCESS TO SHARED STRUCTURES AND FOR MAINTAINING COHERENCE OF DERIVED STRUCTURES IN VIRTUALIZED MULTIPROCESSOR SYSTEMS

(75) Inventors: Ole Agesen, Needham, MA (US); Pratap Subrahmanyam, Sunnyvale, CA (US); Scott W. Devine, San Jose, CA (US); Mendel Rosenblum, Stanford, CA (US); Edouard Bugnion, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.
This patent is subject to a terminal disclaimer.

(21) Appl. No.: 11/185,151

(22) Filed: Jul. 19, 2005

Related U.S. Application Data

(63) Continuation of application No. 10/016,072, filed on Dec. 10, 2001, now Pat. No. 6,961,806.

(51) Int. Cl.
*G06F 13/00* (2006.01)

(52) U.S. Cl. .............................. 711/6; 711/148; 711/203

(58) Field of Classification Search .................... 711/6, 711/148, 203
See application file for complete search history.

(56) References Cited

U.S. PATENT DOCUMENTS 6,961,806 B1 * 11/2005 Agesen et al. ................. 711/6

* cited by examiner

Primary Examiner—Reba I. Elmore
(74) Attorney, Agent, or Firm—Jeffrey Pearce

(57) ABSTRACT

A computer system includes at least one virtual machine that has a plurality of virtual processors all running on an underlying hardware platform. A software interface layer such as a virtual machine monitor establishes traces on primary structures located in a common memory space as needed for the different virtual processors. Whenever any one of the virtual processors generates a trace event, such as accessing a traced structure, then a notification is sent to at least the other virtual processors that have a trace on the accessed primary structure. In some applications, the VMM derives and maintains secondary structures corresponding to the primary structures, such as where the VMM converts, through binary translation, original code intended to run on a virtual processor into code that can be run on an underlying physical processor of the hardware platform. In these applications, the VMM may rederive or invalidate the secondary structures as needed upon receipt of the notification of the trace event. Different semantics are provided for the notification, providing different choices of performance versus guaranteed consistency between primary and secondary structures. In the preferred embodiment of the invention, a dedicated sub-system is included within the VMM for each virtual processor; each sub-system establishes traces, senses trace events, issues the notification, and performs other operations relating specifically to its respective virtual processor.

13 Claims, 3 Drawing Sheets

SYSTEM AND METHOD FOR DETECTING ACCESS TO SHARED STRUCTURES AND FOR MAINTAINING COHERENCE OF DERIVED STRUCTURES IN VIRTUALIZED MULTIPROCESSOR SYSTEMS

CROSS-REFERENCE TO RELATED APPLICATIONS

This application is a Continuation of pending U.S. patent application Ser. No. 10/016,072, filed 10 Dec. 2001 now U.S. Pat. No. 6,961,806.

BACKGROUND OF THE INVENTION

1. Field of the Invention

This invention relates in general to multiprocessor computer systems and in particular to systems that include one or more virtual machines.

2. Description of the Related Art

Researchers and engineers in the field of computer science have developed, and continue to refine, principles and technologies for the construction of efficient and economical general-purpose computer systems. These known systems fall generally into two main categories, namely, those that involve virtualization technology and those that do not. In order to understand the former, it is helpful to understand the latter.

Most computer systems can be conveniently described in terms of layers, in particular, a lower, a middle, and an upper layer. See, for example, Andrew S. Tanenbaum's "Structured Computer Organization," second edition, Prentice/Hall International, 1984.

The lowest layer is the hardware, which includes a processor (CPU), volatile and non-volatile memory, a memory controller (MMU), disk drives and other input and output devices. A wide range of hardware configurations that offer different trade-offs between performance, compatibility, cost, reliability, power consumption and other parameters have been deployed over the years. For example, the Personal Computer (PC) platform, originally introduced by IBM in 1981, uses an Intel-compatible ("x86") CPU. This platform has been widely adopted and has resulted in the development of several subsequent industry standards. Today PCs with compatible hardware layers can be obtained from multiple vendors.

The middle layer, the operating system (OS), is a software layer. Operating systems are among the most complex and largest units of software built and may themselves be internally layered or broken into separate modules using some other organizing principle. Broadly speaking, however, an OS manages the raw hardware layer in the computer system, abstracts it, and augments it with services that are commonly used by software in the higher layers of abstraction (that is, application-level programs). For example, the OS may manage raw hard disks, and perform allocation and scheduling functions to give application programs access to a hierarchical file system. The OS may also offer services or software libraries that are not directly related to any particular hardware device in the computer system itself; for example, it may provide the means for application programs to communicate with each other through shared memory or over a wide-area network. By hiding arbitrary dissimilarities of the hardware layer, and augmenting this layer with additional functionality, operating systems can be seen as infrastructure that enables the construction of higher-level software that works predictably across a family of (somewhat) different hardware configurations.

Over the years, many different operating systems have been developed, reflecting the wide range of uses of computer systems and the diversity of hardware. Some operating systems are restricted to one hardware platform; for example, the Windows98 operating system runs on the PC platform only. Others run on a plurality of platforms; the Solaris operating system, for example, runs on both x86 and SPARC hardware.

The highest layer, the set of application programs, is what most users of computer systems ultimately interact with and care about. This application layer builds upon the general-purpose hardware and operating system layers in order to solve concrete computational and information processing problems. Whereas each unit of hardware ordinarily hosts one OS, in most computer systems, the OS will host a number of application programs, possibly from many different vendors.

To summarize the above discussion, most computer systems can be viewed as consisting of one unit of hardware, one OS that manages the hardware, and a set of application programs running on top of the OS. The choice of hardware will restrict the range of possible OSs and the subsequent choice of OS will, together with the hardware choice, determine the available set of application programs.

The second broad category of general-purpose computer systems includes virtualization technology, in particular, at least one software construct known as a "virtual machine" (VM). As in non-virtualized systems, however, even these build upon hardware and system software layers. FIG. 1 shows the main components of a typical virtualized computer system, which includes an underlying system hardware platform 100 and system software 200.

The system hardware 100 includes one or more central processors CPU(s) 110, which may be a single processor, or two or more cooperating processors in a known multiprocessor arrangement. As in most computers, two different types of data storage are commonly provided: a system memory 112, typically implemented using any of the various RAM technologies, and a usually higher-capacity storage device 114 such as one or more memory disks. The hardware usually also includes, or is connected to, conventional registers, interrupt-handling circuitry, etc., as well as a memory management unit MMU 116. The system software 200 typically includes an operating system OS 220, which will include a conventional fault and interrupt handler 270 as well as drivers 222 as needed for controlling and communicating with the various devices 400 and, usually, for the disk 114 itself.

FIG. 1 also shows that conventional peripheral devices 400 may be connected to run on the hardware 100 via the system software 200. Conventional applications 600 may also be installed to run on the system software 200.

As is well known in the art, a virtual machine (VM) is a software abstraction—a "virtualization"—of an actual physical computer system. As such, each VM will typically include one or more virtual CPUs 310 (VCPU), a virtual operating system 320 (VOS) (which may, but need not, simply be a copy of a conventional, commodity OS), virtual system memory 312 (VMEM), a virtual disk 314 (VDISK), virtual peripheral devices 340 (VDEVICES) and drivers 322 (VDRV) for handling the virtual devices 340, all of which are implemented in software to emulate the corresponding components of an actual computer. As in any other operating system, the VOS will also include a fault or interrupt handler 370, which takes appropriate, predefined actions whenever any virtual CPU (or application 360) performs some action that causes the generation of a fault or interrupt signal.

Of course, most computers are intended to run various applications, and VMs are usually no exception. Consequently, by way of example, FIG. 1 illustrates a group of applications 360 (which may be a single application) installed to run on the VOS 320; any number of applications, including none at all, may be loaded for running on the VOS, limited only by the requirements and purposes of the VM. If the VM is properly designed, then the applications (or the user of the applications) will not "know" that they are not running directly on "real" hardware. Of course, all of the applications and the components of the VM are instructions and data stored in memory, just as any other software. The concept, design and operation of virtual machines are well known in the field of computer science. As FIG. 1 illustrates, several VMs 300-1, . . . , 300-n may be installed to run on a common hardware platform; all may have essentially the same general structure, although they may differ in particulars, including possibly having different operating systems.

Some interface is usually required between a VM and the underlying "real" OS 220 and hardware, which are responsible for actually executing VM-issued instructions and transferring data to and from the actual, physical memory and storage devices 112, 114. In this context, "real" means being either the native OS of the underlying physical computer or other system-level software that handles actual I/O operations, takes faults and interrupts, etc. The interface between the VM and the underlying system software layer and/or hardware is often referred to as a virtual machine monitor (VMM).

A VMM is usually a thin layer of software that runs directly on top of a host, such as the system software 200, or directly on the hardware, and virtualizes all the resources of the machine. The VMM usually tracks and either forwards (to the OS 220) or itself schedules and handles all requests by its VM for machine resources and will typically include software components such as device emulators 540, a memory management unit 512, etc. The interface exported to the respective VM is the same as the hardware interface of the machine, or at least of some predefined hardware platform, so that the virtual OS cannot determine the presence of the VMM, although the VMM will be aware of the VOS. The general features of VMMs are known in the art and are therefore not discussed in detail here.

The VMM also includes a sub-system 570 for taking and either handling or forwarding faults and interrupts. Note that "handling" a fault or interrupt involves executing some predetermined routine, which will depend on the type of fault/interrupt involved.

In FIG. 1, VMMs 500-1, . . . , 500-n, are shown, acting as interfaces for their respective attached VMs 300-1, . . . , 300-n. In the figures, VMs are shown as software entities separate from their respective VMMs. This separation reflects the fact that a VM is, from the viewpoint of a user, a "complete" computer system in its own right, with the VMM remaining transparent to the VM. Considering that both the VM and the VMM are software entities running on the system hardware 100, with out without help from the host system software 200, each VM and its related VMM may, however, also be viewed substantially as a unit: The VM cannot function properly without the VMM or a similar software system, and the VMM has no purpose other than to support the VM. Moreover, it would also be possible to use a single VMM to act as the interface to more than one VM, with the VMM exporting multiple instances of the machine interface. The important point is simply that some well-defined, known interface should be provided between each VM and the underlying system hardware 100 and software 200.

Assume a given hardware platform 100. For instance, this platform could be the Personal Computer platform. The VMM is thus a software program that exports to its respective VM an abstraction of a hardware platform, which may, but need not be, the same as the platform 100. Each feature of the hardware platform will typically (but not necessarily) have a software (virtual) implementation in the VMM. For example, in most virtualized computer systems, the VMM will export a virtual CPU (VCPU) that executes the same instruction set as the hardware CPU, and the VMM will export virtual disk drives and random-access memory whose properties are equivalent to the disk drives and memory implemented in the hardware platform.

In some configurations, each VMM runs directly on the hardware platform and is the only software to do so. In this situation, it is natural to think of the VMM as an additional software layer inserted between the hardware and operating system layers of conventional computer systems.

In other configurations, such as the one illustrated in FIG. 1, the VMM runs side by side with the OS 220, which forms the so-called "host" OS. In this situation, it is still possible to view the VMM as an additional software layer inserted between the hardware and the "guest," that is, virtual OS 320, although the layering differs between the left and right half of the figure. In the left half of FIG. 1, where the host operating system 220 is situated, there is a conventional computer system with three layers: system hardware 100, system software 200 and applications 600. In the right half of the figure, which includes the VMM, we have a four-layer computer system: system hardware, system software, VMM, VM (including user-level applications 360). The software stacks shown in the left and the right halves of the figure operate largely as independent co-routines with the main interaction being that the host OS 220 may be called upon to perform services for the VMM.

It may in some cases be beneficial to deploy VMMs on top of a thin software layer, a "kernel," constructed specifically for this purpose. Contrasting with a system in which VMMs run directly on the hardware platform, use of a kernel offers greater modularity and facilitates provision of services that extend across multiple virtual machines (for example, resource management). Contrasting with the hosted deployment, a kernel may offer greater performance because it can be co-developed with the VMM and be optimized for the characteristics of a workload consisting of VMMs.

One may also concurrently run multiple VMM instances (as illustrated in FIG. 1), each of which exports one instance of the machine interface. From these scenarios, one of the principal advantages of virtualization in general and of using VMMs in particular follows directly: One may execute multiple operating systems on a single hardware platform. The collection of operating systems deployed on VMMs may be diverse, possibly ranging over operating systems from multiple vendors, or it may be uniform, comprising multiple instances of the same operating system image.

Virtual machine monitors have a long history, dating back to mainframe computer systems in the 1960s. See, for example, Robert P. Goldberg, "Survey of Virtual Machine Research," IEEE Computer, June 1974, p. 34–45. Over the years, their popularity has risen and fallen with the changes in the prevailing hardware and software environments. Initially, VMMs were viewed as a way to increase the utilization of expensive hardware resources by multiplexing software environments. Later, hosted VMMs saw increasing use because they grant users of powerful personal computers simultaneous access to multiple operating systems and their application program sets. Use of VMMs to increase utilization of hardware resources has, however, once again been increasing in popularity: VMMs allow a single hardware computer system to co-host multiple independent servers (services), avoiding interference by deploying each server on its own (guest) operating system and managing resources in a kernel layer to allow each server to achieve specified service rates.

Most personal computer systems are equipped with a single processing unit (CPU). Because CPUs today are quite fast, a single CPU often provides enough computational power to handle several "concurrent" tasks by rapidly switching from task to task (a process sometimes known as time-slicing or multiprogramming). This management of concurrent tasks is one of the main responsibilities of almost all operating systems.

The use of multiple concurrent tasks often allows an overall increase in the utilization of the hardware resources. The reason for this is that while one task is waiting for input or output to happen, the CPU may execute other "ready" tasks. See, for example, Abraham Silberschatz and James L. Peterson, "Operating System Concepts," Alternate Edition, Chapter 4, Addison-Wesley Publishing Company, 1989. As the number of tasks increases, however, the point may be reached where computational cycles, that is, CPU power, is the limiting factor. The exact point where this happens depends on the particular workloads.

Consequently, to permit computer systems to scale to larger numbers of concurrent tasks, systems with multiple CPUs have been developed. Such shared (or "symmetric") memory multi-processor (SMP) systems are available as extensions of the PC platform, as well as from other vendors. Essentially, an SMP system is a hardware platform that connects multiple processors to a shared main memory and shared I/O devices. In addition, each processor may have private memory. The operating system, which is aware of the multiple processors, allows truly concurrent execution of multiple tasks, using time-slicing only when the number of ready tasks exceeds the number of CPUs.

In some SMP systems, a single operating system image manages the entire set of CPUs in concert. In other systems, especially those with larger numbers of CPUs, the hardware layer may provide a (physical) partitioning of the system, thereby allowing distinct operating system instances to manage each partition. Partitioning helps overcome scalability bottlenecks in operating systems and increases fault isolation.

Because VMMs and SMP systems both aim to increase the utilization of hardware resources, it is quite attractive to look into ways to enable the convergence of the two technologies. One way to achieve this is to run multiple uniprocessor virtual machines on an SMP system. This simple approach is quite beneficial: The increased availability of computational resources on an SMP hardware layer will usually allow the system to handle a larger number of VMMs than can a uniprocessor system. This arrangement can be viewed as software (or logical) partitioning of an entire SMP system or an SMP partition. Compared with a pure hardware partitioning scheme, use of VMMs offers significant advantages. For instance, the VMMs can partition at a finer grain than is convenient for hardware. Indeed, VMMs can partition down to fractional CPU-equivalents by running more VMMs than there are CPUs. It is relatively straightforward to run multiple uniprocessor VMMs on an SMP hardware system. For example, if a kernel approach is used, only the kernel need be aware of the multiple processors on the underlying SMP system.

Unfortunately, if one is restricted to uniprocessor VMMs, then some types of applications that have been written to take advantage of multiple processors will be unable to run well in virtual machines. This leads to the second way to combine the benefits of multiprocessor technology and virtual machine monitors: One may develop a VMM that "exports" to the guest operating system an SMP abstraction. This VMM will then be able to harness the computational power of multiple CPUs and channel them to the guest operating system where they can be put into service. More precisely, a multiprocessor virtual machine monitor generalizes a uniprocessor virtual machine monitor in that it presents the appearance to guest operating systems of running on (virtual) hardware with multiple CPUs.

In the most general case, there is no a priori restriction on the number p of CPUs on the hardware platform and the number v of virtual CPUs that the VMM exports to the guest operating system 320. One may have p<v, which would necessitate use of time-slicing of the physical CPUs to keep all the virtual CPUs running, or one may have p=v, making it possible to run exactly one VMM at a time on the hardware (but time-slicing these), or one may have p>v, making it possible to run (at least) one VMM with v virtual CPUs and still have physical CPUs available to run other VMMs or services concurrently.

Different implementation techniques are known for uniprocessor VMMs, which focus on two areas of relevance: execution of the virtual machine instruction stream and virtualization of memory and memory-mapped structures.

The traditional way to implement a VMM, dating back to the original mainframe VMMs, involves running the guest operating system code at a less privileged level in the virtual machine than it would have had on a physical machine. When running with lesser privileges, any attempt by the guest to execute a privileged instruction will generate a "trap" (also known as an "exception"). When the VMM senses the trap, it takes control. Effectively, the VMM intercepts any attempt by the (under-privileged) guest operating system to execute a privileged instruction on the physical hardware. A trap handler in the VMM then emulates the effect of the privileged instruction, but changes the state of the virtual machine rather than of the physical machine. For example, if the guest operating system attempts to disable interrupts, the VMM emulation of this operation will record in the virtual machine state that interrupts have been disabled, but will leave interrupts enabled on the physical machine. Once emulation of the privileged instruction has completed, the VMM resumes the virtual machine at its next instruction. To the virtual machine, there is no way to determine that the VMM stepped in to emulate the privileged instruction, except by observing timing effects.

Provided that all privileged instructions trap when execution is attempted with insufficient privileges—a condition that is satisfied on so-called "virtualizable" architectures—the VMM can remain passive during guest system execution, except for the brief intervention when a privileged instruction must be emulated. More precisely, most of the time the VMM can use "direct execution" on the physical hardware to execute the virtual instruction stream. Thus, the virtual machine executes at native speed, except for the slowdown resulting from time-sharing the physical machine with other software and the overhead of occasional emulation of a privileged instruction. As a special case, non-privileged (application level) software in the virtual machine will execute at full speed, since it is generally free of privileged instructions.

However, many contemporary processors, including the x86 family, are not virtualizable using this trap-and-emulate technique alone. VMMs for such architectures therefore employ other techniques in addition to direct execution to execute the virtual instruction stream. For example, the VMM for the x86 architecture produced by VMware, Inc., of Palo Alto, Calif., employs direct execution only for the non-privileged code in the virtual machine and transforms privileged code through a binary translation process before it is allowed to execute.

In addition to controlling the instruction stream executed by software in virtual machines, the VMM must also control other resources in order to ensure that the virtual machines remain encapsulated and do not interfere with other software on the system. First and foremost, this applies to I/O devices that are shared between virtual machines, but it also applies to interrupt vectors, which generally must be directed into the VMM (the VMM will conditionally forward interrupts to the virtual machine). Furthermore, the memory management (MMU) functionality must be under control of the VMM in order to prevent the virtual machine from accessing memory belonging to other software on the computer. Yet other resources, some of which may be specific to particular architectures, including the local and global descriptor tables of the x86 architecture, may need to be monitored or adjusted by the VMM.

In one solution employed in the virtualization products of VMware, Inc., the guest (VM) operating system sets up a global descriptor table (GDT) somewhere in its memory. The GDT defines the segments that the guest operating system uses in its execution of operating system and user level code. (For a general description of segments in the x86 architecture, see "Intel Architecture Software Developer's Manual," vol. 3: "System Programming," Intel Corporation, 1999.) In this configuration, the guest's GDT is referred to as the "primary" GDT. The VMM then derives a "shadow" GDT from the primary GDT. If the guest operating system executes directly on the hardware, it will load a reference to its primary GDT into the physical processor's GDT register. This, however, could be dangerous when running in a virtual machine, which cannot be allowed to have full control over its GDT. Instead of activating the primary GDT, the VMM therefore loads the shadow GDT when running the guest operating system. Since the VMM controls the shadow GDT, it can confine the guest operating system within the virtual machine boundaries.

The structure of the shadow GDT in the VMware, Inc., system generally follows that of the primary GDT, but with permissions down-graded. For example, a data segment descriptor in the primary GDT will yield a derived data segment descriptor in the shadow GDT. Whereas the primary GDT descriptor can take any form that the guest operating system desires, the shadow GDT descriptor will be restricted by the VMM. In particular, the base and the limit of the primary descriptor may permit access to the entire address space (for example, 0 to 0xffffffff), but the VMM may truncate the limit in the shadow descriptor to confine the guest to a smaller range of addresses (for example, 0 to 0xffbfffff). This truncation allows the VMM to remain invisible to guest operating systems since it can reside in the address range inaccessible to guests, in this example, above 0xffbffff.

For correctness, the VMM must propagate modifications from the primary structures to the shadow tables as soon as the guest modifies the primary structures. A convenient way to implement this is to have the VMM write-protect the range of memory where the primary structure resides. Any attempt by the guest to write to the primary structure will then result in a write protection fault (page fault) that the VMM can catch. The VMM then temporarily lifts the write protection, executes the write (perhaps using a single-stepping facility), reestablishes the write-protection, and finally propagates the modification from the primary structure to the shadow structure. The guest then resumes operation in the new context established by the modification of the primary structure.

Abstractly, one may say that the VMM establishes a "write trace" on the primary structure. The write trace provides notification to the VMM whenever the guest attempts to modify the primary structure. This in turn gives the VMM the opportunity to control the modification to the primary structure, and rederive the shadow structure from the primary. In other situations, primarily involving memory-mapped devices, the VMM may use "read traces" to get notification whenever the guest reads a memory location.

To further illustrate the utility of traces, consider the case in which a VMM uses binary translation to execute some of the guest instruction stream. Using the terminology introduced above, the guest instruction stream that is given as input to the binary translator is a primary structure, from which the translator derives a shadow, that is, secondary structure (the translated code). As with any primary/shadow arrangement, if the guest modifies the primary structure (that is, the guest uses self-modifying code), then the VMM must retranslate or invalidate the shadow structure. A convenient way to trigger retranslation or invalidation is for the VMM to apply a write trace to all guest code that has been processed by the binary translator. Any "write" to any memory location containing the guest code will then give rise to a trace fault being issued to the VMM. The VMM then handles this fault by retranslating or invalidating the (possibly) altered code.

From all of this it may be understood that the use of read and write traces to monitor guest access to primary data and code structures is central to the implementation of uniprocessor VMMs. The manner in which different types of traces are established in virtualized, uniprocessor systems, the underlying data structures that make tracing possible, and the concept of sensing faults in response to trace events, are in general well known in computer science. What is needed, however, is a system and method of operation that provides a generalization of traces in order to facilitate the implementation of multiprocessor VMMs. This invention provides such as system and method.

SUMMARY OF THE INVENTION

The invention provides a method and computer system configuration for detecting access to structures in a common memory space that is shared by a plurality of virtual processors included within a virtual machine (VM). According to the invention, a trace is established on at least one traced portion of the common memory space and is associated with a first set of at least one of the virtual processors. The occurrence of a trace event arising from operation of an acting one of the virtual processors (an "acting" virtual processor) is sensed and thereupon a trace notification is issued to each virtual processor in the first set.

The first set of virtual processors, also referred to as the "consuming" virtual processor(s) or simply as the "consumer(s)," includes each virtual processor that has any portion of a primary structure stored in the traced portion of the common memory space. Note that there may, and usually will be, a plurality of traces on different portions of the common memory space, and that the set of consuming virtual processors may (but need not) be different for each trace.

In the preferred embodiment of the invention, with respect to the traced portion of the common memory space, the number of consuming virtual processors may be less than the total number of virtual processors. The virtual processors that are not consumers, and are thus not included in the first set, thereby form a second set of "bystanders." The trace notification is then preferably issued to only the consuming virtual processors. Note that the acting virtual processor may itself also be a consumer.

In most cases, the trace is a write trace and the trace event is any attempt by any of the virtual processors to write to the traced portion of the common memory space. In these cases, the virtual processor attempting to write becomes the acting virtual processor. It is also possible for the trace to be a read trace.

In the most commonly anticipated implementation of the invention, a secondary structure is derived from and corresponds to the primary structure. Each primary structure is accessible to the virtual machine, whereas each secondary structure is transparent to the virtual machine but is accessible to and operable on at least one hardware processor. A trace event is then any attempt by any of the virtual processors to access any primary structure stored in any traced portion of the common memory space. Upon receipt of the trace notification with respect to access to any primary structure, the corresponding secondary structure may then be rederived, whereby coherence between the primary and secondary structures is maintained. Alternatively, the secondary structure may be invalidated, thus at least eliminating incoherence.

One example of a primary structure is original VM code in a virtualization system in which at least some portion of the original VM code may need to undergo binary translation before being executed on an underlying hardware processor. The secondary structure is then the translated code derived from the original VM code through binary translation. Another example of a primary/secondary structure pair is a primary descriptor table and a corresponding shadow descriptor table.

The preferred embodiment of the invention also includes mechanisms for notifying consuming virtual processors that a trace event is either about to occur or has occurred. According to one mechanism, a pre-write notification is issued to the consuming virtual processors. After sending acknowledgement of receipt of the pre-write notification at a virtual instruction boundary, execution of each the consuming virtual processors is suspended. Once all the consuming virtual processors have acknowledged receipt of the pre-write notification, then the acting virtual processor is allowed to complete writing to the traced portion of the common memory space. After completion of the write by the acting virtual processor, execution of the consuming virtual processors is resumed.

A post-write notification may also be issued to the consuming virtual processors once the acting virtual processor has completed its write. The acting virtual processor may then be idled until it receives acknowledgement from all the consuming virtual processors that they received the post-write notification; execution of the acting virtual processor may then be resumed immediately after receipt of the acknowledgement.

The number of virtual processors in the VM need not be the same as the number of physical, hardware processors. Where there is a one-to-one mapping of virtual to hardware processors, however, the trace notification may be issued to each virtual processor by issuing a conventional fault directly to the hardware processor on which the acting virtual processor is running. A physical interprocessor interrupt (IPI) signal is then sent from the hardware processor on which the acting virtual processor is running to the respective hardware processor(s) on which the consuming virtual processor(s) are running.

An interface software layer, for example, a virtual machine monitor (VMM), is preferably included between the VM and the underlying hardware platform. The VMM (or analogous software layer) carries out several operations in support of the VM. For example, the VMM is responsible for providing for execution of VM-issued instructions; for transferring data between the VM and physical memory; for establishing a trace on at least one traced portion of the common memory space; for associating the trace with at least one consuming virtual processor (which may be the acting processor itself); for sensing the occurrence of each trace event and issuing the trace notification to each consuming virtual processor; and for issuing any pre- and/or post-write notifications to consuming virtual processors and sensing their acknowledgements of receipt of such notifications.

In the preferred embodiment of the invention, a separate sub-monitoring module (a "sub-VMM") is included within the overall, "global" VMM layer for each virtual processor. Establishing traces, sensing trace events, issuing notifications and acknowledgements, and other operations specific to each virtual processor such as maintaining secondary structures are then preferably carried out by that virtual processor's respective sub-VMM. Modules are thereby included in the global VMM to coordinate the activities of and signals between the individual sub-VMMs.

DETAILED DESCRIPTION

Figure 1:
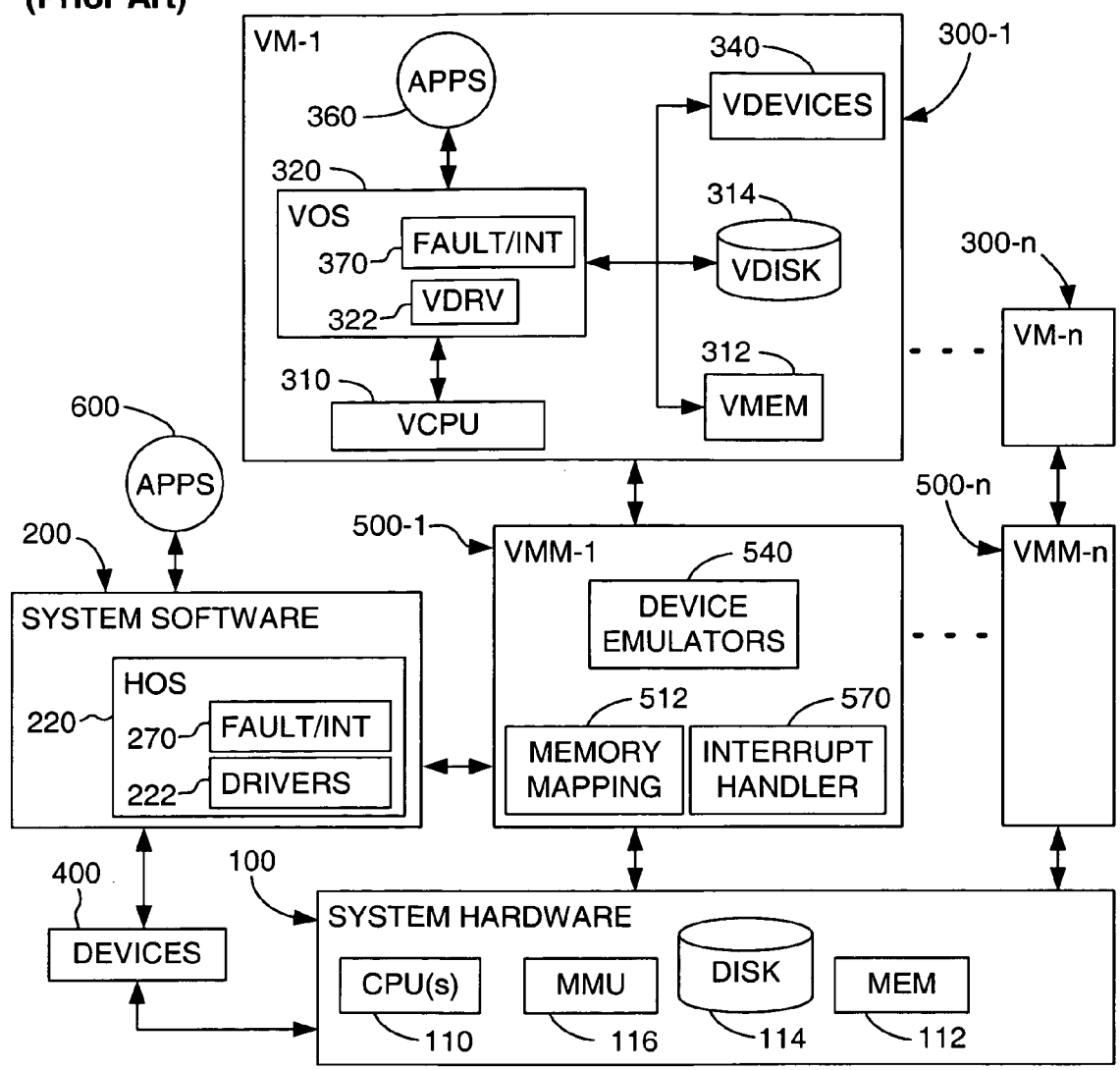
FIG. 1 is a block diagram that shows the main hardware and software components of a prior art computer system that includes at least one virtual machine.
Figure 2:
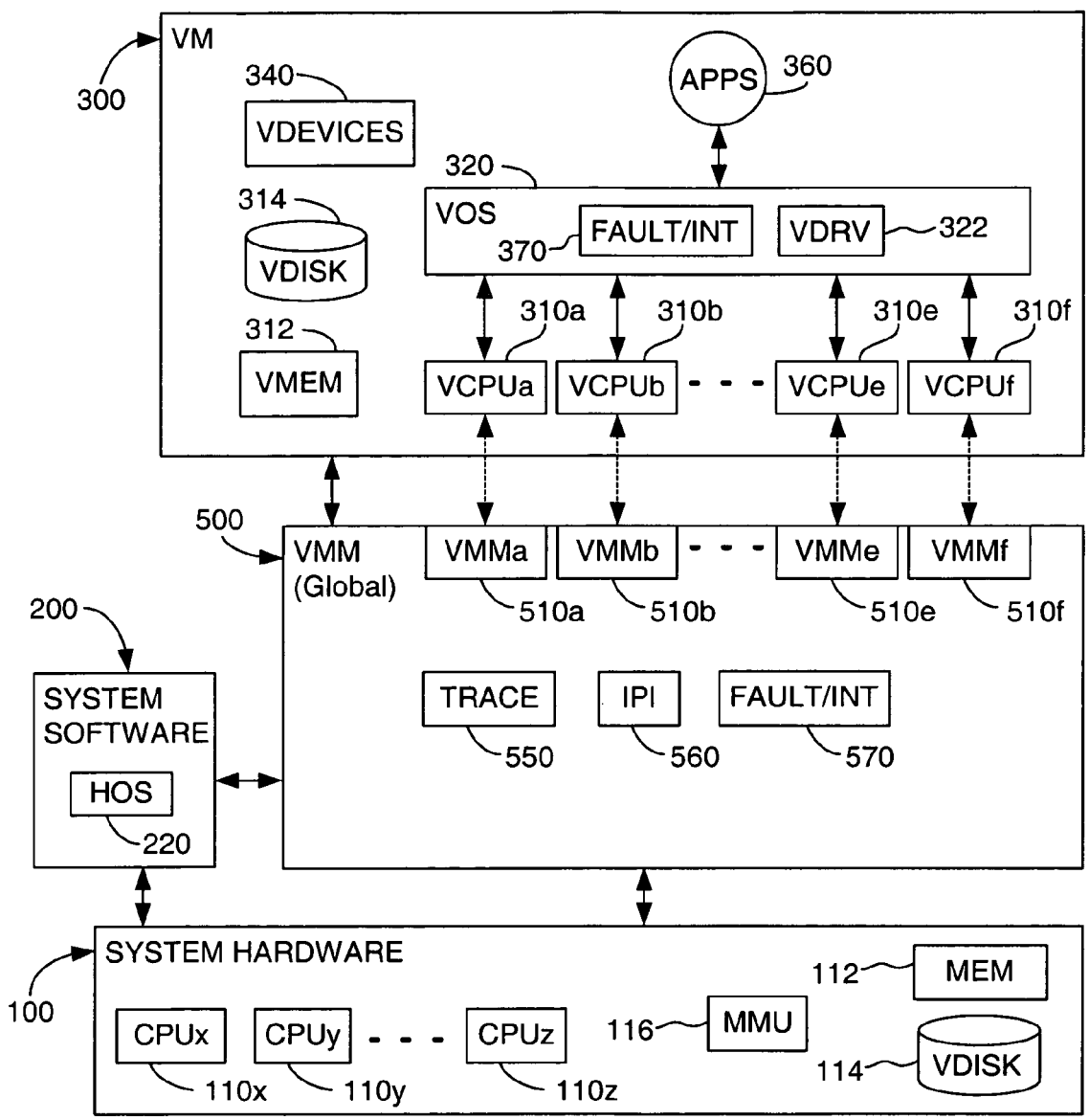
FIG. 2 is a block diagram that shows the structure of a virtual machine monitor according to the invention that supports a multi-processor virtual machine.

In broadest terms, the invention involves an implementation of traces for efficient and precise virtualization of SMP systems. The general context in which the invention is useful is illustrated in FIG. 2, namely, a system in which a virtual machine (VM) 300 and a virtual machine monitor (VMM) 500, which controls the VM, together virtualize a multi-processor architecture. Other components of the overall computer system will be as shown in FIG. 1. Thus, the hardware platform 100, the system software 200, and multiple VM/VMM pairs may be included. Moreover, as is described above, the VMM may be at the same system level as the host operating system 220 (as shown in FIG. 1), or the host OS 220 may be intermediate the VMM 500 and the hardware 100, or a separate OS-like kernel may reside between the VMM and the hardware 100. This invention does not require the VMM to reside within any particular software layer. Unique to the invention, however, is that the VMM 500 includes a trace subsystem 550, whose function is described below.

As FIG. 2 illustrates, this invention operates in a multi-processor context. Thus, the system hardware 100 includes a plurality of CPUs shown as CPUx, CPUy, CPUz, with reference numbers 110x, 110y, . . . , 110z. Similarly, the VM 300 has a plurality of virtual processors VCPUa, VCPUb, . . . , VCPUe, VCPUf, with reference numbers 310a, 310b, . . . , 310e, 310f. Although not required by the invention, merely to simplify the following discussion, but without ruling out other configurations, it is assumed here that there is a one-to-one mapping from virtual to physical CPUs. That is, when the VMM is active, then each virtual CPU is running on a physical CPU. One advantage of this configuration is described below.

If there are more virtual processors than hardware processors, then a conventional time-sharing routine will be included in the VMM (or HOS, depending on which software layer provides the direct interface with the hardware) to distribute hardware CPU time among the various virtual processors. If there are more hardware processors than virtual processors, then excess hardware processor may simply be allowed to be idle or to run other VMMs or programs. Adjustments to the invention described below to accommodate other than one-to-one virtual-to-hardware processor configurations will therefore be either unnecessary or may be made within the VMM using known techniques.

Of course, no virtual processor runs directly on a corresponding hardware processor. Rather, by definition, each virtual processor is merely a software construct that interacts with other components within the VM as if it were a physical processor. An interface corresponding (but not necessarily identical) to an actual hardware processor is therefore exported to each virtual processor by a respective subsystem in the VMM. Thus, the "global" VMM 500 shown in FIG. 2 includes subsystems or "sub-VMMs" VMMa, VMMb, . . . , VMMe, VMMf, (indicated by reference numbers 510a, 510b, . . . , 510e, 510f, respectively) that act as dedicated interfaces and monitors for the respective virtual processors VCPUa, VCPUb, . . . , VCPUe, and VCPUf. As needed, each sub-VMM may also halt and resume execution of its corresponding virtual CPU, or change its state. Each sub-VMM includes software modules for memory mapping and fault/interrupt/exception handling for its respective virtual CPU as shown in the single, dedicated VMM of FIG. 1.

Each sub-VMM therefore preferably includes conventional mechanisms for establishing traces on memory locations, either for its own internal use or corresponding to traces on virtual memory as required for operations of sub-systems (such as a virtual CPU) within the VM. One reason that the sub-VMM may need to establish traces on physical memory locations is to detect any access to primary data structures for which the sub-VMM has created corresponding secondary, that is, derivative data structures. For example, each sub-VMM may maintain shadow descriptor tables for its respective virtual CPU, in which case it will need to be aware of any attempt on the part of the guest operating system VOS 320 to modify any descriptors in the primary structure. As another example, if any of the instructions of a virtual CPU need to undergo binary translation before execution on the physical processor, then the respective sub-VMM preferably also includes the appropriate binary translation sub-system (or a link to a common binary translator located in the global VMM 500). The sub-VMM will then also be aware of the location of the original code and will need to know of any write operation that would affect the original code.

Traces may also be necessary, however, even in the absence of secondary, that is, derivative, data structures. For example, assume that different VCPUs are known or found (using any known mechanism) to have some identical body of executable code or data. In order to conserve the actual hardware memory, the VMM 500 could then map the different instances of this code to a single copy in the machine memory. A trace should then be established on the shared memory region(s) so that the VMM 500 can take appropriate action (such as creating an additional "private" copy) if any virtual CPU attempts to modify the shared copy.

As another example, traces are also commonly used to detect accesses to address ranges (in the common memory address space) where the virtual machine has mapped devices, for example, interrupt controllers. The device is set up to be visible at a certain memory address range and the (virtual) CPU manipulates the device by writing to and reading from this memory range. As part of virtualizing such a device, a trace may be applied to that memory range, which will provide notification of any access to the virtual device.

The global VMM 500 will include software modules used to coordinate the operation of the sub-VMMs, and to control and support functions of the VM that are not related to specific virtual processors. In particular, the global VMM 500 includes software modules, in particular, a trace subsystem 550 and an interprocessor interrupt (IPI) sub-system 560, that implement different aspects of this invention. These are described further below.

Two main complications arise when generalizing traces to SMP systems. First, in a uniprocessor system, trace activity is synchronous (with the exception of device DMA). Thus, trace events happen in direct response to the processor executing an instruction that accesses the traced location. In contrast, on a multiprocessor system, trace activity becomes asynchronous: A trace event may happen because some other processor accesses a location being traced by the current processor.

Second, in shared memory multiprocessor systems, CPUs may exchange information through memory. Writes to memory performed by one CPU may thus be observed by another CPU either through reading or executing at the memory location. This communication channel must be carefully integrated with the trace subsystem 550 employed in the VMM to present the multiprocessor guest operating system 320 with causality and ordering constraints consistent with what it might observe when executing on actual hardware.

Each VCPU within the VM can give rise to a trace event, which is defined as any attempt to modify a data structure on which a write trace has been placed by either one or more of the sub-VMMs 510a, 510b, . . . , 510e, 510f, or by the global VMM 500, or any attempt to read from a memory location on which a read trace has similarly been established. Note that all traces are visible to and effective among all sub-VMMs and the global VMM. As mentioned above, trace events include, but are not limited to, attempts to modify code that has undergone binary translation within the VMM; attempts to modify primary descriptor tables that have been shadowed within the VMM; and attempts to otherwise write to or read from any memory location that for any reason has been marked with a write or read trace, respectively.

In the following discussion, it is sometimes stated that one or more VCPUs establishes a trace. This is so because traces are established according to the needs of particular VCPUs, for example, in order to maintain coherency between primary and secondary code and other data structures. In practice, the sub-VMM responsible for each VCPU will in fact establish traces as needed for "its" VCPU; indeed, the existence of the trace and handling mechanism may be completely transparent to the VM (in particular, by the VOS) itself, such as in the case where the respective VCPU's code must undergo binary translation within the VMM (or corresponding sub-VMM) in order to ensure proper execution on the given hardware platform. Note that any traces established by any sub-VMM on behalf of any VCPU will be observable within the global VMM 500 structure, in particular, by the trace sub-system 550.

According to the invention, with respect to a trace event, each VCPU will play at least one of three roles—Actor, Consumer, or Bystander:

Actor—An "acting" VCPU is any VCPU that triggers a trace event by accessing a (memory) location L that one or more VCPUs have placed traces on.

Consumer—A "consuming" VCPU is one that has established a trace on the location L. Consuming VCPUs will receive a notification (asynchronously) when a trace event occurs.

Bystander—A bystander VCPU is one that has established no trace on location L. Bystanders receive no notification when the trace event occurs.

Figure 3:
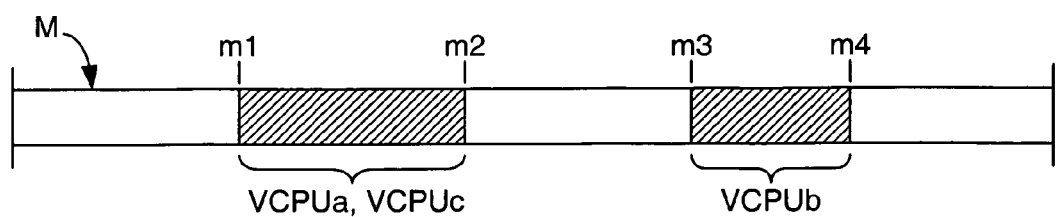
FIGS. 3 and 4 illustrate two examples of shared and overlapping memory regions, respectively.
Figure 4:
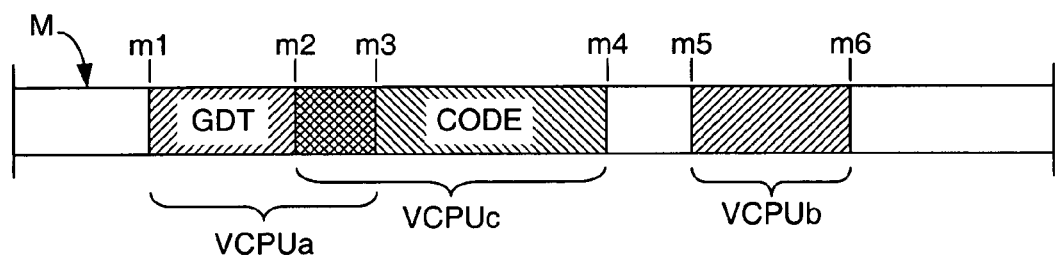

For each trace event, there will be exactly one acting VCPU, one or more consumers, and zero or more bystanders. The acting VCPU will also simultaneously play the role of consumer or bystander. The VMM therefore functionally partitions the set of VCPUs into consumers and bystanders. FIGS. 3 and 4 illustrate these concepts.

In FIG. 3, a region of memory is indicated as M. Within the memory space M, assume that write traces have been established for both VCPUa and VCPUc on all memory locations from memory location m1 to memory location m2, that is, in a region [m1, m2). (As indicated by the left square bracket and right parenthesis, memory regions are assumed here to be inclusive at the lower bound and exclusive at the upper bound. This convention is adopted merely for the sake of consistency.) A trace has also been established for VCPUb from memory location m3 to memory location m4, that is, in a region [m3, m4) by its respective sub-VMM VMMb. In other words, in this example, two different VCPUs are using the single memory region [m1, m2), on which their respective sub-VMMs VMMa and VMMc (or the global VMM's trace subsystem 550) have placed traces. This might be the case, for example, where this memory region contains a descriptor table shared by both virtual processors, or single body of code that at least partially required binary translation.

Now assume that a different virtual processor, say, VCPUe attempts to write to any memory location in the region [m1, m2). This will trigger a "trap" or "fault" that the sub-VMMs VMMa and VMMc both must be notified of. VMMb will, however, not "care" about this access. In this example, VCPUe is the actor, both VCPUa and VCPUc are the consumers, and VCPUb is a bystander. If, instead of VCPUe attempting the write in the traced region, VCPUa did so, then VCPUa would be both the actor and a consumer.

FIG. 4 illustrates a different example, in which traces have been put on memory regions [m1, m3), [m2, m4), and [m5, m6) for VCPUa, VCPUc, and VCPUb, respectively. In this example, the traced regions for VCPUa and VCPUc overlap, specifically in memory region [m2, m3), although they are not identical, and relate to different primary structures (a global descriptor table GDT and pre-binary translation code, respectively). With respect to any attempt to write to the different memory regions, the three VCPUs will have the following roles:

| Region | VCPUa | VCPUb | VCPUc |
|---|---|---|---|
| [m1, m2) | Consumer | Bystander | Bystander |
| [m2, m3) | Consumer | Consumer | Bystander |
| [m3, m4) | Bystander | Consumer | Bystander |
| [m5, m6) | Bystander | Bystander | Consumer |

Of course, a VCPU may be the actor in any given case and all VCPUs will be bystanders with respective to untraced memory regions. The trace region(s) of memory and the role of each VCPU with respect to each traced region is preferably maintained within the global VMM's trace sub-system 550 using any conventional data structure. Upon each memory access (read or write, or both, depending on the type of trace) to a traced memory location, the appropriate sub-VMMs is then notified as described below.

Once a sub-VMM receives notification of a trace event, then it will execute any appropriate fault or interrupt-handling routine. For example, in FIG. 4, if any acting VCPU were to write to a memory location in the region [m2, m3), then VMMa would need to rederive the corresponding shadow descriptor table (secondary structure) and VMMc would need to retranslate or invalidate the affected code. Note that both read and write traces may be used in the memory space M, and that one VCPU may put a read trace on the same locations that another VCPU has a write trace on—the only difference will be what type of action will cause a trace event to be indicated and appropriate notification to be sent to sub-VMMs.

In a simple embodiment of the invention, the set of bystanders is always empty. In other words, whenever any VCPU establishes a trace on a location, then all other VCPUs implicitly establish a null trace and their sub-VMMs are notified of each trace event. Here, a "null trace" means that the sub-VMM receives notification, but the handling "routine" it runs upon such notification has the effect of ignoring the trace event. One advantage of this approach is that it reduces the administrative burden on the VMM. A disadvantage, however, is that this approach may be less scalable than a system that permits bystanders.

In the preferred embodiment of the invention, trace notifications are delivered to the consuming VCPUs through the interprocessor interrupt (IPI) facility 560 located within the global VMM. The fault handler 570 will then analyze the reason for the trace event and direct the facility 560 to send an IPI to the sub-VMMs of all consuming VCPUs. Note that the trace sub-system 550, the IPI facility 560, and the fault handler 570 may also be considered to be a single software sub-system with different modules for the different functions needed in the invention, namely, keeping track of traces and the role(s) of each VCPU with respect to trace events, sensing of trace events, and notification of consumers. These functions are shown as being performed by separate sub-systems 550, 560, 570 in FIG. 2 merely for the sake of clarity.

The preferred embodiment of the invention may use any of several trace semantics, in particular, "bracketing" and "post-write broadcasting." When using bracketing, the acting VCPU (that is, its sub-VMM) broadcasts a pre-write notification via the IPI facility 560 to the consumers. The sub-VMMs of the consumers then acknowledge receipt of the pre-write notification at a virtual instruction boundary and stall (suspend execution of) their respective VCPUs. When all consumers have acknowledged the notification, and are therefore known to be in a stalled state, the acting VCPU performs the write, after which it sends a completion signal to the stalled consumers, which may then resume execution.

Using the technique of post-write broadcasting according to the invention, upon any trace event, such as an acting VCPU writing to a write-traced traced location, the IPI facility 560 sends a signal ("broadcasts") notifying all consumers that the write has occurred. Thereafter, the post-write broadcasting technique may be either synchronous or asynchronous. When using synchronous post-write broadcasting, the actor waits, that is, is kept idle, (for example, by having its execution suspended completely or by having it execute a wait loop, etc.) until all consumers have acknowledged the IPI before continuing with its own execution, although it does not wait until the consumers have processed the consequences of the trace. When using asynchronous post-write broadcasting, the actor does not wait for IPI acknowledgement.

Using the asynchronous broadcasting technique, the actor cannot be certain that the IPI was actually received by all consumers, since it does not wait for acknowledgement. On the other hand, IPI acknowledgement can take a long time—a few hundred CPU cycles would be typical on modern hardware. If post-write broadcasting is used, then the system designer will need to weigh the importance in the given application of the increased consistency guarantee of the synchronous technique against the increased performance of the asynchronous technique.

Synchronous post-write broadcasting is a semantic that lies between bracketing and asynchronous post-write broadcasting on the scale of guaranteed consistency versus performance: Because synchronous post-write broadcasting does not require that the consumer VCPU's current instruction be completed before the trace message can be processed, it is faster than full bracketing. On the other hand, the synchronous post-write semantic is, as mentioned above, slower than the asynchronous semantic.

There is another possible form of notification, namely, prewrite broadcasting, in which the acting VCPU broadcasts its intent to write to a traced location, and then performs the write. Such pre-write broadcasting appears to be less useful in practice, however, because it provides no way for a consuming VCPU, upon receipt of a notification, to know when the value in the traced location has been updated. Consequently, consumers would have no reliable way to revalidate a shadowed structure. A way to eliminate this weakness of such pre-write broadcasts, and thereby to increase their utility, would be to include, along with the broadcast, information about what will be written. Consuming sub-VMMs could then analyze the additional information and take appropriate action.

The choice between the different trace semantics will depend on the consistency guarantee required in any given situation. For example, the choice between post-write and bracketing semantics involves a fundamental trade-off: Bracketing traces offer strong consistency guarantees but worse performance than post-write broadcasts. The strong consistency follows because bracketing traces force all consumers to leave the traced memory location (indeed, all locations) alone while the update takes place. The higher cost results from stalling the consumers and having the acting VCPU wait for consumer acknowledgments. In general, post-write broadcasts are preferable when the primary structure is subject to weak consistency on ordinary hardware, and there is some reason to assume that guests (VMs) are correctly programmed to handle this weaker consistency.

As is mentioned above, the assumption of a one-to-one mapping between virtual and physical CPUs is preferable, but not required by the invention. The advantage of this mapping is that it may be used to make the chosen broadcasting mechanism more efficient: Notifications of trace events may be passed as conventional faults directly to the physical CPU that is running the acting VCPU; this physical CPU will then send a physical IPI to the physical processors on which the consuming VCPUs are running.

For each type of trace (MMU, GDT, binary translation, etc.), based on knowledge of guest (VM) code and the hardware consistency specification, a skilled software designer will be able to choose the best form of trace semantics (post-write or bracketing) in any given application of the invention. For the purpose of improving the ability to debug, experiment with, and tune the performance of the system, it would also be possible to include as part of an implementation of the invention run-time options that override the default choice of trace semantics for each type of trace. For example, if it is suspected that MMU inconsistencies cause guest crashes in a multiprocessor virtual machine, then one could force the use of bracketing trace semantics for the MMU trace type to rule out or confirm problems.

Note that MMU traces will usually be responsible for most of the trace activity in typical virtual operating systems on SMP virtual machines. This is important because it is also the type of trace for which it is most likely that the guest (VM) will tolerate use of the fast post-write broadcast trace semantics. This expectation may be justified as follows: Assume that the virtual OS 320 has been designed to cope with a hardware-loaded translation look-aside buffer (TLB, a well-understood concept in the art of operating systems). In the most common computer systems, in which memory is managed in units such as "pages," following a write to a page table location, the TLB may contain "stale" entries. A correct VM must therefore synchronize TLB invalidation (flush) across all the CPUs; this problem is known in the art as "TLB shootdown." The VMM 500 according to the invention can therefore use post-write broadcasts to keep track of which shadow MMU structures are affected by writes to page table locations and defer the actual invalidation until the VCPU issues a TLB flush instruction, thereby relying on the guest's TLB shootdown code to establish a barrier between the modification of a page table location and its use.

In order to illustrate one advantageous use of the invention, consider the common case in which code is running on the common Intel x86 architecture. In this architecture, page table entries may be cached in TLBs, whereas code may be cached in data structures known as icaches. Despite their seeming similarity, it is unclear whether such code can be handled with post-write broadcasts. icaches are consistent on the CPU that issues a code-modifying write. However, for cross-processor code modification, where one CPU (X) modifies code that another CPU (Y) is executing or about to execute, the consistency may be weaker. As is specified in the "Intel Architecture Software Developer's Manual," vol. 3, section 7.1.3 (see above), as soon as Y has read from memory a value that was written by X after the code was modified, then Y can safely execute the new code. No explicit icache invalidation is required (unlike, for example, SPARC systems manufactured by Sun Microsystems, Inc.).

Now consider this situation in virtual machines: Assume that the acting VCPU performs a write to a traced location L, and then is delayed (for example, the physical processor on which it is running is delayed for any of many common reasons) before it can notify the consuming VCPUs of the trace event. Assume further that a consumer has translated code from location L. A bystander might now execute the (new) code at location L for the first time. This code may modify some other location M. Assume further that the modification to location M can happen only by executing the new code at location L. Now, a consumer VCPU might execute the original code from location L, and this code may observe the new value in location M. Without the mechanisms provided by the invention, the virtual (guest) operating system could observe such a contradiction, with unpredictable and possibly disastrous consequences. The invention prevents such a contradiction/violation of the memory consistency rules of the platform being virtualized from occurring.

We claim:

1. A computer program embodied in a tangible medium, the computer program detecting access to structures in a common memory space shared by a plurality of virtual processors included within a virtual machine, the computer program performing the following steps:
   establishing a trace on at least one traced portion of the common memory space;
   associating the trace with a first set of at least one of the virtual processors; and
   sensing the occurrence of a trace event arising from operation of an acting one of the virtual processors and thereupon issuing a trace notification to each virtual processor in the first set.

2. A computer program as in claim 1, in which the first set of virtual processors includes each virtual processor that has any portion of a primary structure stored in the traced portion of the common memory space.

3. A computer program as in claim 2, in which:
   with respect to the traced portion of the common memory space, the first set of virtual processors includes fewer than the total number of the virtual processors, those virtual processors not included in the first set forming a second set; and
   issuing the trace notification to only the virtual processors in the first set.

4. A computer program as defined in claim 2, further performing the step of deriving a secondary structure from and corresponding to the primary structure.

5. A computer program as in claim 4, in which:
   each primary structure is accessible to the virtual machine;
   each secondary structure is transparent to the virtual machine but is accessible to and operable on at least one hardware processor; and
   the trace event is any attempt by any of the virtual processors to access any primary structure stored in any traced portion of the common memory space
   the computer program further performing the following step:
      upon receipt of the trace notification with respect to access to any primary structure, rederiving the corresponding secondary structure, whereby coherence between the primary and secondary structures is maintained.

6. A computer program as in claim 5, in which the primary structure is original VM code and the secondary structure is translated code derived from the original VM code through binary translation.

7. A computer program as in claim 5, in which the primary structure is a primary descriptor table and the secondary structure is a shadow descriptor table.

8. A computer program as in claim 1, in which the acting virtual processor is also in the first set of virtual processors.

9. A computer program as in claim 1, in which the trace is a write trace and the trace event is any attempt by any of the virtual processors to write to the traced portion of the common memory space, the virtual processor attempting to write thereby becoming the acting virtual processor.

10. A computer program as in claim 9, further performing the following steps:
    issuing a pre-write notification to the virtual processors in the first set;
    for each of the virtual processors in the first set, acknowledging receipt of the pre-write notification at a virtual instruction boundary and suspending execution of the virtual processors in the first set;
    after acknowledgment of receipt of the pre-write notification by all of the virtual processors in the first set allowing the acting virtual processor to complete writing to the traced portion of the common memory space;
    after completion of writing by the acting virtual processor, resuming execution of the virtual processors in the first set.

11. A computer program as in claim 9, further performing the following steps:
    allowing the acting virtual processor to complete writing to the traced portion of the common memory space; and
    issuing a post-write notification to the virtual processors in the first set.

12. A computer program as in claim 11, further performing the following steps:
    after completion of the write by the acting virtual processor, idling the acting virtual processor until receipt of acknowledgement from the virtual processors in the first set of their receipt of the post-write notification; and
    immediately resuming execution of the acting virtual processor after the acknowledgement of the post-write notification.

13. A computer program as in claim 1, further performing the following steps:
    running each virtual processor exclusively on a respective hardware processor; issuing the trace notification to each virtual processor by issuing a conventional fault directly to the hardware processor on which the acting virtual processor is running and thereupon sending a physical interprocessor interrupt (IPI) signal from the hardware processor on which the acting virtual processor is running to the respective hardware processor(s) on which the virtual processor(s) in the first set are running.

* * * * *